United States Patent [19]

Tinholt et al.

[11] 4,190,139
[45] Feb. 26, 1980

[54] CENTERING ABUTMENT FOR VISCOUS FLUID DRIVE

[75] Inventors: Thomas H. Tinholt, Marshall; Phillip E. Konkle, Albion, both of Mich.

[73] Assignee: Eaton Corporation, Cleveland, Ohio

[21] Appl. No.: 912,283

[22] Filed: Jun. 5, 1978

[51] Int. Cl.² .................. F16D 35/00; F16D 43/25
[52] U.S. Cl. .................... 192/58 B; 192/82 T
[58] Field of Search ............ 192/58 B, 82 T; 29/156.8 FC, 464

[56] References Cited

U.S. PATENT DOCUMENTS

| | | | |
|---|---|---|---|
| 2,948,268 | 8/1960 | Roper et al. | 192/58 B |
| 3,055,473 | 9/1962 | Oldberg et al. | 192/58 B |
| 3,191,733 | 6/1965 | Weir | 192/58 B |
| 3,194,372 | 7/1965 | Weir | 192/58 B |
| 3,339,689 | 9/1967 | Sutaruk | 192/58 B |
| 3,536,175 | 10/1970 | Kawabe et al. | 192/58 B |
| 4,046,239 | 9/1977 | Tinholt | 192/58 B |
| 4,061,218 | 12/1977 | Tinholt | 192/58 B |

*Primary Examiner*—Rodney H. Bonck
*Attorney, Agent, or Firm*—R. J. McCloskey; J. Yakimow

[57] ABSTRACT

A centering abutment to readily locate the clutch member relative to the side member of the housing of a viscous fluid drive. The side member has an opening for a bearing in which is located an input shaft. Lands and grooves are located on the side and clutch members. When substantial radial clearance exists between the housing and clutch member, problems are encountered in assembling the members. Assembly time is greatly reduced by providing the centering abutment on one of the members for alignment with a trough in the other member. The length of the abutment is greater than the length of the lands on the member and preferably has an angled outer portion for quick alignment.

12 Claims, 4 Drawing Figures

CENTERING ABUTMENT FOR VISCOUS FLUID DRIVE

Viscous fluid drives are generally assembled by placing a housing, containing a centrally located bearing, over one end of an input shaft and then placing a clutch member, containing a centrally located opening, over the one end of the input shaft and pressing the housing and clutch member onto the shaft. Generally, the close tolerances between the outer perpheral surface of the housing defining the working chamber or the length of the input shaft results in proper alignment of the three components to insure that the lands and grooves on the clutch member and housing are properly located relative to one another. However, with certain new designs of viscous drives, the radial clearance between the peripheral surfaces on the housing and clutch member is too large to allow for rapid location of the clutch member relative to the housing and/or the input shaft is too short to permit proper alignment of the clutch member relative to the input shaft. These deficiencies can result in either misalignment of the clutch member and housing or an increase in assembly time causing increased product cost.

It is, accordingly, an object of the invention to reduce assembly time and insure proper component alignment of a viscous fluid drive.

A feature of the invention is providing a generally annular alignment abutment on the clutch member which fits within a trough on the housing to align the lands and grooves of the clutch member and housing relative to each other during assembly of the clutch member onto the input shaft.

Figures 1, 2:
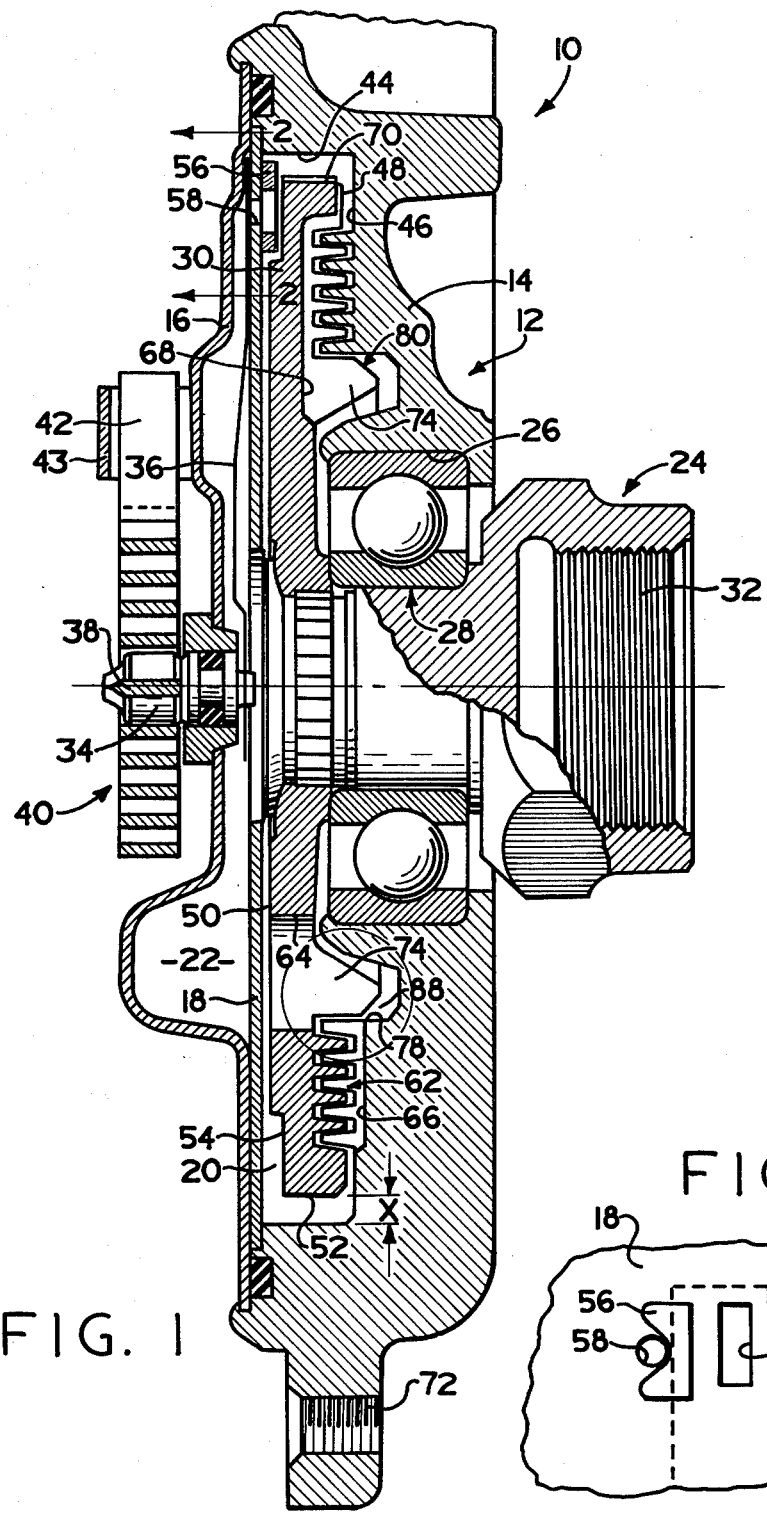
FIG. 1 is a side elevational view in section of one-half of a temperature responsive viscous fluid drive according to the invention.
FIG. 2 is a view taken along line 2—2 of FIG. 1.

FIG. 1 illustrates a viscous fluid drive 10 comprising a housing 12 having an annular generally radially extending side member 14 and a cover plate 16 defining a cavity. The cavity is divided by radially extending valve plate 18 into a working chamber 20 and a reservoir 22. An input shaft 24 is supported for rotation within an input shaft opening 26 of housing 12 by a bearing 28. An annular generally radially extending clutch member 30 is secured to one end of input shaft 24 and is located within working chamber 20. The other end of input shaft 24 includes an internally threaded portion 32 which is secured to a shaft that is rotated by an engine of a vehicle (not illustrated). Viscous fluid (not illustrated) is provided within the cavity to transfer rotational forces from clutch member 30 to housing 12. Mounted along rotational axis of input shaft 24 is a valve shaft 34 which is free to rotate within cover plate 16. One end of valve shaft 34 is secured to a valve arm 36 while the other end of the valve shaft is secured to the inner end 38 of a bimetallic helical coil spring 40. The outer end 42 of spring 40 is connected to a clip 43 which is rigidly attached to cover plate 16.

Housing 12 includes an annular peripheral surface 44 and an annular generally radially extending surface 46 on side member 14 which define, in part, working chamber 20. Another boundry of working chamber 20 is defined by valve plate 18. Clutch member 30 includes a pair of annular generally radially extending surfaces 48 and 50 which are axially spaced and are adjacent to surface 46 and valve plate 18. Clutch member 30 further includes an annular peripheral surface 52 that is spaced radially from annular peripheral surface 44 a radial distance of X units.

Located on surface 50 is an annular pumping surface 54. A pump element 56 is rigidly secured to valve plate 18 and is closely spaced from pumping surface 54. A discharge passage 58 is located in cover plate 18 and communicates working chamber 20 with reservoir 22. When clutch member 30 rotate fluid flows from working chamber 20 to reservoir 22 via passage 58. Located immediately behind pump element 56 is an inlet passage 60 which communicates reservoir 22 with working chamber 20. As best seen in FIG. 2, valve arm 36 is movable to either cover inlet passage 60 or discharge passage 58.

Surfaces 46 and 48 are provided with a plurality of spaced interdigitated generally axially extending lands and grooves 62. For purposes of this disclosure this area will be defined as the shear area. Clutch member 30 further includes a plurality of circumferentially spaced openings 64 located intermediate the shear area and input shaft 24. Circumferentially spaced around side member 14 and clutch member 30 are located a plurality of radially extending fluid flow passages 66 and 68 which are generally U-shaped in configuration. In the preferred embodiment four flow passages 66 are located in side member 14 spaced ninety degrees apart while three flow passages 68 are located in clutch member 30 spaced one hundred and twenty degrees apart. Each flow passage 68 in clutch member 30 terminates at its outermost portion in an axially extending slot 70 on peripheral surface 52.

Briefly, drive 10 operates in the following manner. A fan is secured to housing 12 by a plurality of bolts each located in a circumferentially spaced opening 72. Threaded portion 32 is secured to a shaft on a vehicle engine and is rotated by the engine to rotate input shaft 24 in a clockwise direction as viewed in FIG. 2. When valve arm 36 is located in a position illustrated in FIG. 2, fluid is pumped out of working chamber 20 into reservoir 22 via passage 58. When the fluid is pumped out of the working chamber a minimal amount of drive occurs between clutch member 30 and housing 12. As the temperature of the vehicle's engine increases and such temperature increases are sensed by spring 40, valve arm 36 rotates to the left in FIG. 2 covering discharge passage 58 and uncovering inlet passage 60. This rotation of valve arm 36 prevents the flow of fluid out of working chamber 20 to reservoir 22 while allowing for fluid flow from reservoir 22 into working chamber 20 through inlet passage 60. As fluid fills working chamber 20 rotation of clutch member 30 results in an increase in rotation of housing 12 through viscous shear. As the vehicle's engine cools down and such lower temperatures are sensed by spring 40 valve arm 36 is again moved back to the position illustrated in FIG. 2 and fluid again is pumped out of working chamber 20 into reservoir 22 resulting in a decrease in the rotational speed of housing 12.

Figure 4:
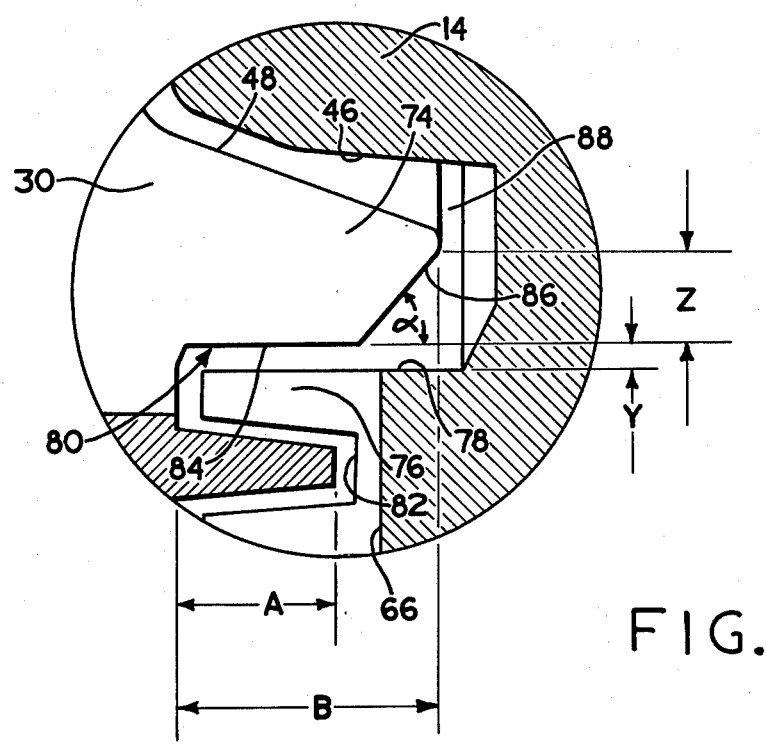
FIG. 4 is an enlarged view of the circled area illustrated in FIG. 1.
Figure 3:
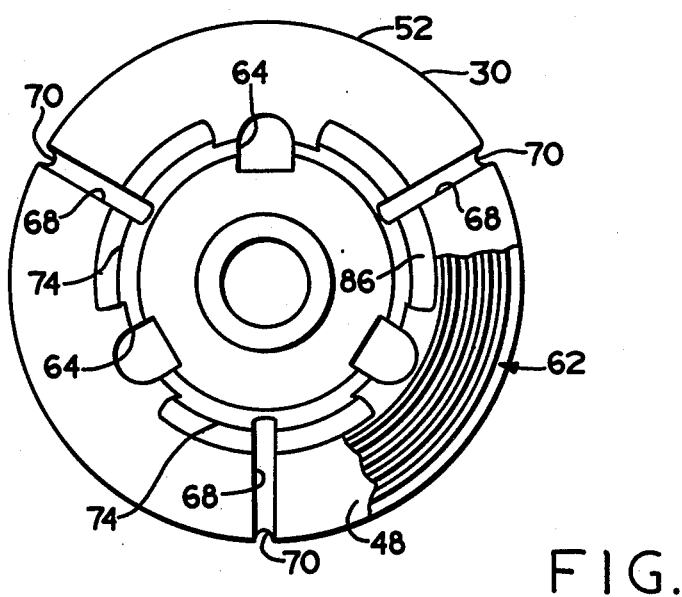
FIG. 3 is a view, at reduced scale, of the lands and grooves face of the clutch member illustrated in FIG. 1.

Referring now to FIGS. 3 and 4 clutch member 30 includes a generally annular centering abutment 74 defined on the annular generally radially extending surface 48. The radially innermost land 76 on side member 14 is defined by a generally cylindrically shaped surface 78. Radially spaced from surface 78 by a radial distance of Y units is a generally cylindrically shaped surface 80 on abutment 74 generally conforming to generally cylindrically shaped surface 78 and having an axial length B which is greater than the axial length A of the lands on the corresponding member-clutch member 30. Surface 80 is defined in greater detail by an annular axially inner portion 84 adjacent clutch member 30 that is cylindrical and concentric with cylindrical surface 78 on side member 14 and an axially outer portion 86 adjacent side member 14 that extends axially and radially inwardly toward the axis of rotation of input shaft 24 from the axially inner portion 84 a radial distance of Z units and at an angle of forty-five degrees. Cylindrical surface 78 defines in part a generally annular trough 88 in side member 14 for reception of centering abutment 74.

In viscous fluid drive 10, the dimension X is in the range of 0.070 to 0.100 of an inch when the dimension Y is in the range of 0.004 to 0.030 of an inch. It is preferred to maintain the dimension Y as small as possible and preferably within the range of 0.004 to 0.015 of an inch. In the foregoing arrangements the dimension A is in the area of 0.1 inches, and dimension B in the area of 0.2 inches. The axial distance between surfaces 46 and 48 in the shear area is in the area of 0.025 inches.

In one embodiment of drive 10, when the diameter of surface 52 is approximately three and one-half inches, dimension X is of the order of 0.085 inches, dimension Y is of the order of 0.010 inches, and dimension Z is of the order of 0.070 inches. For ease of assembly it is preferred that the sum of dimensions Y plus Z is equal to or greater than fifty percent of dimension X and preferably in the range of seventy to one hundred and ten percent of dimension X.

Although various modifications are intended within the scope of the attached claims, the invention finds particular utility in viscous fluid drives wherein the radial dimension X is relatively large compared to the distance between the interdigitated lands and grooves. In the disclosed embodiment, the dimension X is in the area of eight to ten times as large as the radial distance between adjacent lands on the clutch member 30 and side member 14. It should further be appreciated that although the annular abutment 74 is defined as a generally annular member, it is in fact illustrated in the preferred embodiment as having a series of six separate portions. At opening 64, the distance between adjoining portions is approximately forty degrees while at slot 68 adjacent abutments are separated by the distance of the slot. It is, accordingly, only significant that alignment abutment 74 provide for approximately three hundred and sixty degree registry of clutch member 30 relative to side member 14. It may, however, as illustrated be interrupted and still fall within the scope of the terminology "annular." It should further be noted that it is contemplated that annular alignment abutment 74 may be located in other positions on clutch member 30 or, in fact, on side member 14 as long as it accomplishes the results set forth.

Only the portion of surface 80 which extends beyond dimension A is effective in aligning clutch member 30 relative to side member 14. This effective aligning surface, in the illustrated embodiment surface 86, may begin axially anywhere along surface 80. It is, however, only effective beyond the dimension of A units. It is preferred that the effective aligning surface be straight in radial cross section (as illustrated) and located at an angle of at least 30 degrees relative to the axis of rotation to assure rapid assembly.

The term "generally cylindrical shaped surface" as used herein refers to an axially extending surface on which a plane perpendicular to the axis would define, if the surface was continuous, a circle. For example, in FIG. 4, surface 80, consisting of surfaces 84 and 86, and surface 78 are considered as "generally cylindrical shaped surfaces" for the purposes of this disclosure. This is true even though surface 80 is interrupted at openings 64 and slots 68.

What is claimed is:

1. In a viscous fluid drive having a housing with an annular generally radially extending side member adapted to be rotated about an axis, a centrally located input shaft opening defined in said side member, a working chamber in said housing defined in part by an annular peripheral surface on said housing and an annular generally radially extending surface on said side member, a clutch member located within said working chamber and defined in part by an annular peripheral surface spaced radially from said peripheral surface on said housing by a distance of X units and an annular generally radially extending surface axially spaced from said radially extending surface on said side member, and a plurality of spaced interdigitated generally axially extending lands and grooves defined on said generally radially extending surfaces of said members intermediate said input shaft opening and said peripheral surface on said clutch member, the improvement comprising: a generally axially extending annular trough in one of said members on the radially extending surface of said one member defined in part by a generally cylindrically shaped surface, the axial depth of said trough being greater than the axial depth of said grooves on said one member; and a centering abutment located on said generally radially extending surface of said other member and being defined in part by a generally cylindrically shaped surface having an axial length of B units which is greater than the axial length of A units of said lands on said other member and radially spaced from said generally cylindrically shaped surface on said one member by a distance of Y units which is substantially less than said distance of X units to readily locate said clutch member relative to said side member for interdigitation of said lands and grooves.

2. A drive according to claim 1 wherein said generally cylindrically shaped surface on said one member defines in part the radially innermost land on said one member; and said centering abutment is located radially inwardly from the lands and groove of said one member.

3. A drive according to claim 1 or 2 wherein: said generally cylindrically shaped surface on said one member is cylindrical having an axis corresponding to said axis of said housing; said generally cylindrically shaped surface of said centering abutment has an annular axially inner portion adjacent said other member that is cylindrical and concentric with said cylindrical surface on said one member and an axially outer portion adjacent said one member that extends axially and radially inwardly toward said axis from said axially inner portion a radial distance of Z units; and Y units plus Z units is equal to or greater than fifty percent of X units.

4. A drive according to claim 1 or 2 wherein at least one of said generally cylindrically shaped surfaces has an annular portion that extends axially and radially inwardly toward said axis a radial distance of Z units;

and Y units plus Z units is equal to or greater than fifty percent of X units.

5. A drive according to claim 4 wherein said surface that extends axially and radially inwardly is, in radial cross section, straight and extends at an angle of at least thirty degrees to said axis.

6. A drive according to claim 4 wherein said surface that extends axially and radially inwardly is on said centering abutment.

7. A drive according to claim 6 wherein said surface that extends axially and radially inwardly has an axial length that is less than or equal to B units minus A units.

8. A drive according to claim 6 wherein said centering abutment has an axially inner portion adjacent said other member that is cylindrical and an axially outer portion adjacent said one member that is said axially and radially inwardly extending surface.

9. A drive according to claim 1 or 2 wherein said one member is said side member.

10. A drive according to claim 1 or 2 wherein X units is in the range of 0.070 to 0.100 of an inch and Y units is in the range of 0.004 to 0.030 of an inch.

11. A drive according to claim 3 wherein X units is in the range of 0.070 to 0.100 of an inch and Y plus Z units is seventy to one hundred and ten percent of X units.

12. A drive according to claim 11 wherein Y units is in the range of 0.004 to 0.015 of an inch.

* * * * *